United States Patent [19]

Fisher

[11] Patent Number: 5,172,592
[45] Date of Patent: Dec. 22, 1992

[54] OMNIDIRECTIONAL PRESSURE SENSING HEAD

[75] Inventor: Joseph R. Fisher, Sudbury, Mass.

[73] Assignee: Pacer Systems, Inc., Billerica, Mass.

[21] Appl. No.: 587,417

[22] Filed: Sep. 25, 1990

[51] Int. Cl.⁵ .......................... G01F 1/34; G01W 1/02
[52] U.S. Cl. .......................... 73/189; 73/182; 73/861.42
[58] Field of Search .............. 73/182, 189, 861.42, 73/861.65

[56] References Cited

U.S. PATENT DOCUMENTS

| | | | |
|---|---|---|---|
| 3,372,596 | 3/1968 | Keller | 73/861.42 |
| 3,373,605 | 3/1968 | Beilman | 73/182 |
| 3,382,715 | 5/1968 | Larkin et al. | 73/861.65 |
| 3,400,584 | 9/1968 | Beilman | 73/182 |
| 4,360,888 | 11/1982 | Onksen et al. | 73/182 |

*Primary Examiner*—Donald O. Woodiel
*Attorney, Agent, or Firm*—Iandiorio & Dingman

[57] ABSTRACT

An omnidirectional pressure sensing head includes a rotatable hub; a channel extending through the hub having an inlet and an outlet; and a single pressure sensing port in the hub disposed in the channel between the inlet and outlet for sensing the dynamic pressure of the fluid through the channel which is a function of the speed of the hub through the fluid and the rotational speed of the hub.

11 Claims, 2 Drawing Sheets

5,172,592

OMNIDIRECTIONAL PRESSURE SENSING HEAD

FIELD OF INVENTION

This invention relates to an omnidirectional pressure sensing head, and more particularly to such a pressure sensing head using a single centrally located channel in a rotating hub adapted for use in a fluid speed sensing system.

BACKGROUND OF INVENTION

One conventional omnidirectional air speed sensing system uses a pair of pressure sensing ports disposed within shrouds mounted on the distal ends of diametrically opposed arms rotatable about their central axis. A pressure transducer at the conjunction of the arms senses the differential pressure at the two pressure ports and converts that to an electrical signal which is transmitted along the rotating shaft through slip rings to the electronic circuits which determine the air speed from the differential pressure signal. By using two spaced pressure sensing ports, that system inherently pneumatically cancels signals such as the d.c. component, and second harmonic and higher harmonics which are not essential to determining air speed and leave a single, first harmonic, linear in nature, which represents by its amplitude, the air speed, and by its phase, the sense of direction of the aircraft. The elongate arms which support the pressure ports serve to increase the magnitude of the first harmonic and thus insure higher signal-to-noise ratios and more accurate speed readings.

The elongate rotatable arms tend to make the device large, cumbersome and delicate, as well as difficult to place on aircraft. Since the two pressure ports contribute to the cancellation of unwanted signal components, the arms, ports and shrouds must be carefully balanced and mirror each other to a high degree to ensure that the final signal output is clean and accurate. If the differential pressure transducer is in the rotating part then the electrical signal must be transmitted from the rotating to the non-rotating part using slip rings or the like, which add expense as well as maintenance and reliability problems. If the differential pressure transducer is in the non-rotating part then there are two pressures that have to be conducted from the rotating to the non-rotating part.

With the introduction of a technique for extracting the fundamental or first harmonic from the d.c. component and higher harmonics, as taught in copending application filed on even date herewith, entitled "Harmonically Filtered Speed Sensing System", Joseph R. Fisher, the use of a single and shorter arm has been achieved. However, many of the shortcomings associated with two arms and longer arms, such as bulkiness, large size, fragility and difficulty in placement, still persist.

SUMMARY OF INVENTION

It is therefore an object of this invention to provide an improved pressure sensing head.

It is a further object of this invention to provide such an improved pressure sensing head adapted for use in an omnidirectional velocity sensing system.

It is a further object of this invention to provide such an improved pressure sensing head which is small, compact, rugged and simple.

It is a further object of this invention to provide such an improved pressure sensing head which uses a unipartite hub.

It is a further object of this invention to provide such an improved pressure sensing head which produces a strong fundamental harmonic signal.

The invention results from the realization that a truly compact and effective pressure sensing head can be made using a unipartite hub with a channel through it and a pressure sensing port in the channel.

This invention features an omnidirectional pressure sensing head including a rotatable hub and a channel extending through the hub having an inlet and an outlet. A single pressure sensing port in the hub is disposed in the channel between the inlet and the outlet for sensing the dynamic pressure of the fluid moving through the channel, which pressure is a function of the speed of the hub through the fluid and the rotational speed of the hub.

In a preferred embodiment the channel may include a narrow area smaller in cross-sectional area than either the inlet or the outlet. The channel may be crescent shaped. The inlet may be larger than the outlet. The inlet is oriented facing in the direction of rotation and at an angle to the tangent. The outlet is oriented opposite the direction of rotation and at an angle to the tangent. The hub may be generally circular in shape, and the channel may extend around the axis of rotation within the hub. The inlet and outlet may be on opposite sides of the hub, and the pressure sensing port is located in a narrow area of the channel.

DISCLOSURE OF PREFERRED EMBODIMENT

Other objects, features and advantages will occur to those skilled in the art from the following description of a preferred embodiment and the accompanying drawings, in which.

Figure 3:
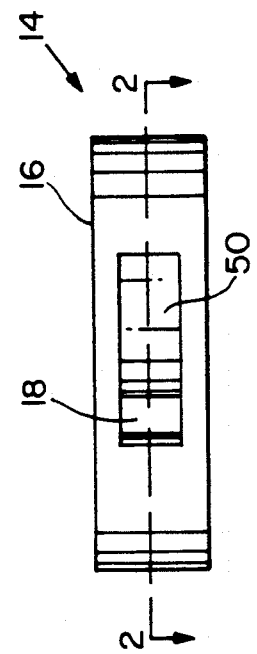
FIG. 3 is a side elevational view of the inlet side of the head of FIG. 2.

The invention may be accomplished using an omnidirectional pressure sensing head which has a rotatable hub that has a generally circular shape, with a channel extending through the hub from an inlet to an outlet. The hub is typically a unitary or unipartite construction having no extraneous parts, so that it may be made small, compact and quite rugged. The channel extends from a larger inlet to a small outlet with a narrowed area in between which is smaller than either the inlet or the outlet. The channel is typically curved in a path around the central rotational axis of the hub and may effect a crescent-like shape. The inlet is oriented facing in the direction of rotation of the hub at an acute angle to the tangent. The outlet faces in the opposite direction from that of the rotation and is also inclined at an angle to the tangent. The inlet and outlet are generally on opposite sides of the hub. There is a pressure sensing port in the channel which is located in the narrowed area. The port communicates through the channel the dynamic pressure of the fluid flow which is a function of both the speed of the hub through the fluid and the rotational speed of the hub about its own axis. The channel geometry may be adjusted to enhance the signal strength associated with the fundamental or first harmonic, and reduce the strength of the second harmonic of the frequency of rotation of the hub about its axis.

This invention is an improvement over the pressure/air speed sensing heads used in conventional systems known as LORAS and OADS, U.S. Pat. Nos. 3,373,605; 3,400,584; and 4,360,888, which are incorporated here by reference in their entirety. In such systems, the velocity of fluid flow is measured by sensing the differential pressure between two pressure sensing ports enclosed within shrouds at the ends of elongated rotating arms. The pressure ports sense the effects of fluid flow through the shrouds and past the pressure sensing ports. The pressure at the two pressure sensing ports is conducted to a differential pressure transducer which rotates with the arms. In such systems, the pressure in one arm is:

$$P_1 = P_0 - P_V \tag{1}$$

where $P_0$ is the ambient or static pressure and $-P_V$ represents the decrease in pressure caused by the flow of fluid, be it gas or liquid, past the pressure sensing port within the shroud at the end of the arm. According to Bernoulli's Principle, $$P_V = \tfrac{1}{2}\rho V^2_{net} \tag{2}$$

where $\rho$ is the density of the fluid and $V_{net}$ results from the combined effects of the tangential speed of rotation $V_R$ of the shroud and the speed $V_F$ of the flow of the surrounding fluid past the entire apparatus, which is assumed to be uniform either unchanging in time or changing slowly compared to the period of rotation of the shroud. The exact relationship among $V_R$, $V_F$ and $V_{net}$ depends upon various geometric and fluid dynamic effects, but is reasonably approximated by $$V_{net} = V_R + V_F \cos\theta \cos\phi \tag{3}$$

where $\theta$ is the angle between the direction of the fluid flow and the plane of rotation of the arms and shrouds and where $\phi$ is the angle measured in the plane of rotation between the projection of the fluid flow velocity vector onto the plane and the instantaneous direction of motion of the shroud. If $V_P$, equal to $V_F \cos\theta$, is the projected component of fluid flow, then $$P_1 = P_0 - \tfrac{1}{2}\rho(V_R + V_P \cos\phi)^2 \tag{4}$$

The instantaneous motion of the second shroud is directly opposite to that of the first shroud since it is mounted diametrically opposed from it. Thus the component of the fluid flow through the second shroud is the negative of that for the first shroud. Therefore the pressure $P_2$ in the second arm is $$P_2 = P_0 - \tfrac{1}{2}\rho(V_R - V_P \cos\phi)^2. \tag{5}$$

The differential pressure sensed in these systems is then expressed as $$P_1 - P_2 = -\tfrac{1}{2}\rho[(V_R + V_P \cos\phi)^2 - (V_R - V_P \cos\phi)^2]. \tag{6}$$

This can be simplified to $$P_1 - P_2 = -\tfrac{1}{2}\rho[4V_R V_P \cos\phi] \tag{7}$$

and once again reduced to simply $$P_1 - P_2 = -2\rho V_R V_P \cos\phi \tag{8}$$

where $-2\rho V_R$ becomes a constant multiplier of velocity $V_P$ and the phase $\phi$ represents the direction of the velocity. Thus as the arms of the LORAS or OADS sensor rotate, the output signal voltage from the differential pressure transducer is a cosine wave with the amplitude proportional to the magnitude of the in-plane component of the fluid flow velocity and to the rotational speed of the shrouds, and with phase such that the extremes of voltage occur when the shrouds are moving instantaneously directly into and away from the projected component of fluid flow. Thus, through the use of two equal and opposite sensing devices on diametrically opposed elongate arms, the LORAS or OADS system is able to acquire a fairly strong signal in which all the other terms cancel, leaving a simple expression for the speed and direction of the velocity. This is not the case when one of those sensing arms is eliminated: the signal emanating from a single sensing arm or port is not the beneficiary of any cancelling effect which would simplify the obtaining of the essential information.

In accordance with this invention, the fluid flow path formed by a single rotating pressure sensing port obeys the same principle as in a single shroud of the LORAS or OADS systems and is given approximately by $$P_N = P_0 - \tfrac{1}{2}[V_0 + V_1(\phi)]^2 \tag{9}$$

where $V_0$ is the flow past the pressure port induced by rotation alone and $V_1(\phi)$ represents the additional flow past the pressure port resulting from the flow of the fluid surrounding the device, that is, the movement of the sensor through the fluid medium. The difference in pressure is thus represented as $$\Delta P = P_N - P_0 \tag{10}$$

$$\Delta P = -\tfrac{1}{2}\rho[V_0 + V_1(\phi)]^2 \tag{11}$$

The terms $V_0$ and $V_1(\phi)$ are analogous to the terms $V_R$ and $V_P \cos\phi$ in the conventional LORAS or OADS system.

The same analysis applies to the pressure sensing head of this invention, where a curved channel employees a pressure sensing port at a constricted portion of the channel.

Figure 1:
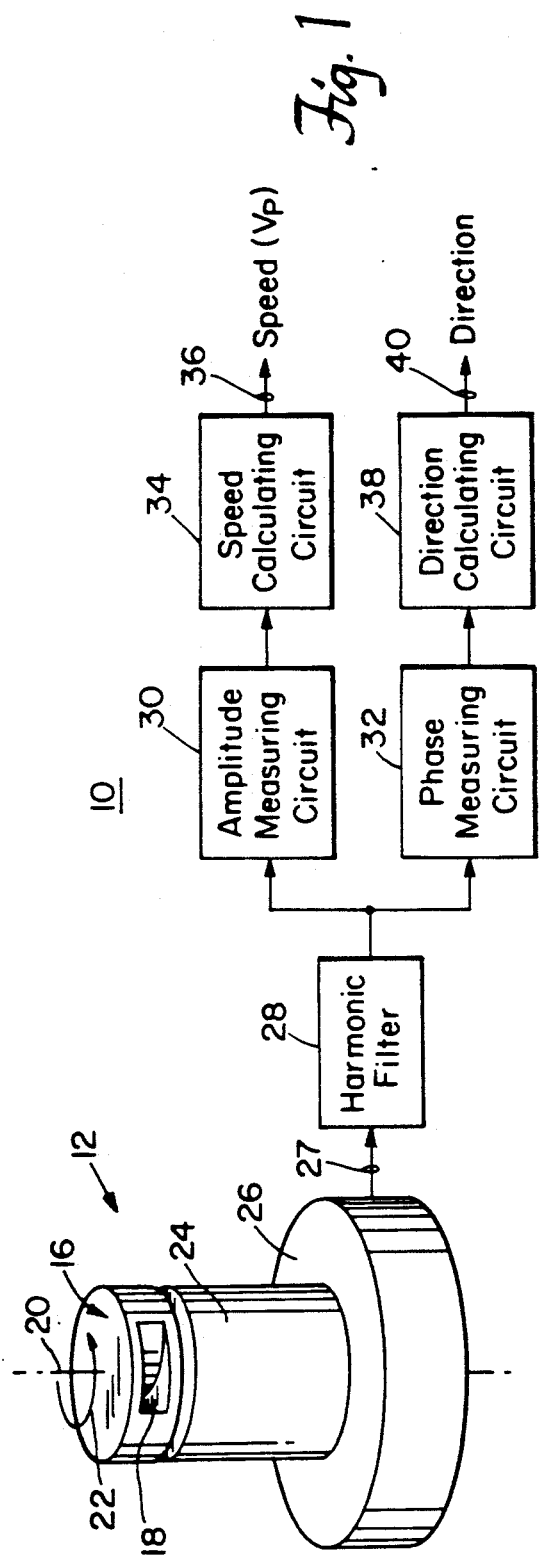
FIG. 1 is a schematic block diagram of a pressure sensing head according to this invention in a pressure sensing system employed in an omnidirectional air speed sensing system.

An omnidirectional speed sensing system 10, FIG. 1, according to this invention in one embodiment includes a pressure sensing head 12 having a rotatable member or hub 16 according to this invention. The pressure sensing port is inside channel 18 in hub 16, which rotates about its central axis 20 in the direction of arrow 22. The pressure sensed at that port is directed down through column 24 to a pressure-sensing transducer in base 26, where the transducer typically compares it with ambient or static pressure. The signal representative of the sensed pressure or the differential pressure is delivered on line 27 to harmonic filter 28. It is not necessary that the transducer be a differential pressure transducer, but it does provide the benefit of eliminating d.c. drift components and other noise.

Harmonic filter 28 blocks any zero harmonic or DC levels as well as higher harmonics, and typically passes only the fundamental or first harmonic. This first harmonic sinusoidal waveform is submitted to the amplitude measuring circuit 30 and to the phase measuring circuit 32. As the hub rotates about its axis, the dynamic pressure varies periodically at the period of rotation of the hub. The magnitude of the pressure increases with increasing rate of relative motion of the hub through the fluid and with the speed of rotation of the hub. These circuits may be simply a peak detector and a timer and zero crossing detector, respectively. The amplitude is then delivered to speed calculating circuit 34, which may be a scaling of measured amplitude to speed units, which directly delivers the speed $V_P$ on line 36. The phase measuring circuit 32 provides its output to direction calculating circuit 38, which may be a scaling of the measured time at the zero crossing to obtain the angle of the motion of the apparatus with respect to the surrounding fluid, which directly indicates on line 40 the direction of motion of the apparatus.

Figure 2:
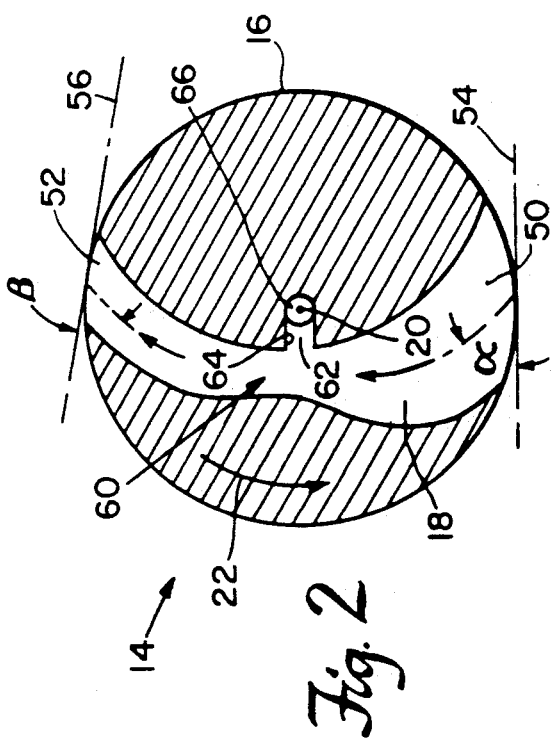
FIG. 2 is a schematic top plan sectional view of the pressure head of FIG. 1 according to this invention taken along line 2—2 of FIG. 3.
Figure 4:
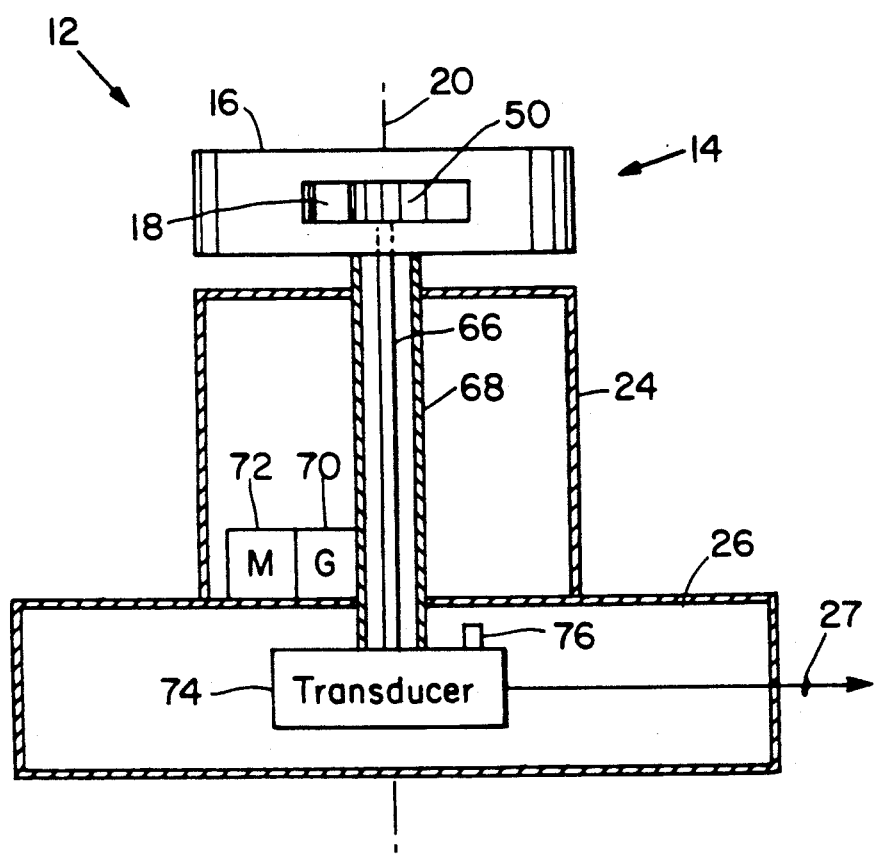
FIG. 4 is a schematic side elevational sectional view of the pressure sensing system including the pressure sensing head according to this invention shown in FIG. 1.

Channel 18 in hub 16 includes inlet 50 and outlet 52, FIGS. 2 and 3, which are shown on generally opposite sides of hub 16. Inlet 50 is larger than outlet 52 and is inclined to the tangent 54. Inlet 50 faces in the direction of rotation 22. Outlet 52 faces opposite to the direction of rotation 22 and is also oriented at an acute angle to tangent 56. Channel 18 follows a curved path through hub 16 around the axis of rotation 20. Its form is generally crescent-shaped and it includes a narrow or constricted area 60 at which is located the pressure sensing port 62. Port 62 communicates through passage 64 with vertical bore 66, FIG. 4, in shaft 68, which is rotated through gears 70 by drive motor 72.

The pressure sensed at port 62 is reflected through passage 64 and down bore 66 in shaft 68 to differential transducer 74, which has a second port 76 for sensing static or ambient pressure.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. An omnidirectional pressure sensing head for use in determining the relative velocity and direction of a fluid, comprising:
    a rotatable hub having an exterior surface region interfacing with the fluid, said hub further having an axis of rotation;
    a channel extending through said hub and having an inlet and an outlet at said hub interfacing surface; and
    a single pressure sensing port in said hub disposed in said channel between said inlet and outlet for sensing the dynamic pressure of the fluid within said channel, the pressure being a function of the relative translational speed of said hub through the fluid and the rotational speeds of said inlet and outlet.

2. The pressure sensing head of claim 1 in which said channel includes a narrow area smaller in cross sectional area than either the inlet or outlet.

3. The speed sensing of claim 2 in which said port is proximate said narrow area of said channel.

4. The pressure sensing head of claim 1 in which said channel is curved.

5. The pressure sensing head of claim 1 in which said channel is crescent shaped.

6. The pressure sensing head of claim 1 in which said inlet is larger than said outlet.

7. The pressure sensing head of claim 1 in which said inlet is oriented facing in the direction of rotation and said channel forms an acute angle with said hub interfacing surface.

8. The pressure sensing head of claim 1 in which said outlet is oriented facing opposite the direction of rotation and said channel forms an acute angle with said hub interfacing surface.

9. The pressure sensing head of claim 1 in which said hub is generally cylindrical in shape.

10. The pressure sensing head of claim 1 in which said channel extends around the axis of rotation of said hub.

11. The pressure sensing head of claim 1 in which said inlet and outlet are on opposite sides of said hub.

* * * * *